United States Patent
Fowler et al.

(10) Patent No.: US 6,447,705 B1
(45) Date of Patent: Sep. 10, 2002

(54) TACKIFIER APPLICATION FOR RESIN TRANSFER MOLDING

(75) Inventors: Gray E. Fowler, Allen; Steve P. Phifer, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 459 days.

(21) Appl. No.: 08/882,809

(22) Filed: Jun. 26, 1997

Related U.S. Application Data

(60) Provisional application No. 60/020,668, filed on Jun. 28, 1996.

(51) Int. Cl.$^7$ .......................... B29C 70/48; B32B 27/26
(52) U.S. Cl. ....................... 264/255; 264/129; 264/257; 264/258
(58) Field of Search ................................ 264/258, 257, 264/129, 255

(56) References Cited

U.S. PATENT DOCUMENTS

| | | | | |
|---|---|---|---|---|
| 4,470,862 A | * | 9/1984 | More et al. .................. | 156/245 |
| 4,988,469 A | * | 1/1991 | Reavely et al. ............. | 264/113 |
| 5,061,542 A | * | 10/1991 | Brace .......................... | 264/258 |
| 5,064,705 A | * | 11/1991 | Donovan, Sr. ............... | 264/258 |
| 5,080,851 A | * | 1/1992 | Flonc et al. ................. | 264/258 |
| 5,360,671 A | * | 11/1994 | Harris ......................... | 264/258 |
| 5,427,726 A | * | 6/1995 | White et al. ................. | 264/258 |
| 5,429,066 A | * | 7/1995 | Lewit et al. ................. | 264/258 |
| 5,432,010 A | * | 7/1995 | Ko et al. ..................... | 264/258 |
| 5,698,318 A | * | 12/1997 | Burton et al. ................ | 264/258 |

* cited by examiner

*Primary Examiner*—Jan H. Silbaugh
*Assistant Examiner*—Stefan Staicovici
(74) *Attorney, Agent, or Firm*—Wade James Brady III; Frederick J. Telecky, Jr.

(57) ABSTRACT

A method of creating or fabricating a composite preform wherein a mixture of a catalyst and a first epoxy resin is applied to at least one layer of fibers, preferably in the form of a fabric, mat or unidirectional tape. A plurality of stacked layers is formed from layers of fibers with applied mixture thereon, preferably in a mold. The layers are pressurized and/or heated to reduce the viscosity, such as but not limited to melting, of the first epoxy resin and catalyst and then allowed to fuse together to form a preform. The preform in the closed mold is impregnated with a mixture of a second epoxy resin and a polycyanate to cause cross-linking, the cross-linking including the first epoxy resin. The first and second epoxy resins may be the same.

20 Claims, No Drawings

TACKIFIER APPLICATION FOR RESIN TRANSFER MOLDING

This application claims benefit of U.S. provisional no. 60/020,668 filed Jun. 28, 1996.

BACKGROUND OF THE INVENTION

1. Field of the Invention

This invention relates to a method of fabricating complex composite preforms.

2. Brief Description of the Prior Art

Resin transfer molding (RTM) is a procedure for fabricating advanced composites wherein fibers in some form are placed in a tool, such as a mold, and a thermosetting resin is then injected into the tool around the fibers and hardened to provide the complex composite preform in the shape of the tool. A sub-process critical to the resin transfer molding (RTM) process is the fabrication of dry fiber "preforms". To fabricate these preforms requires the ability to hold layers of woven or directional dry, fiber or mat fiberglass™ (a grass fiber), quartz, graphite, kevlar ™ (aramid fiber), etc.) together to form a near net shape of the composite part. This preform is then placed in a matched metal tool and injected with a properly degassed and stoichiometrically mixed thermosetting resin blend.

A typical prior art process is shown in U.S. Pat. No. 5,080,851 wherein there is disclosed a method for forming stabilized preforms for complex composite articles using a solid meltable uncatalyzed thermosetting resin as the stabilizing agent. The resin is applied to each layer of the preform and heated to melt the resin and bond the layers together. After cooling, the resin resolidifies, but does not cure and thereby holds the layers in the desired preform shape. The layers can be first formed into a flat sheet as a raw material from which shaped preforms can be made by cutting the sheet into sections. These sections are placed over a mandrel and reheated to remelt the semi-solid resin and allow the preform to conform to and thereafter retain the shape of the mandrel. Utilizing this process allegedly allows complex composite parts to be easily preformed and assembled prior to placement in a mold for resin transfer molding without inhibiting part strength because the resin is compatible with the injection resin and is cocatalyzed by the catalyst contained in the injection resin.

A problem with the prior art is that it includes thermoplastic non-reactive binders and requires stitching, both diminishing the critical properties required from an advanced composite. The prior art also includes a powdered uncatalyzed resin, distributed by hand. The distribution is operator dependent and the fact that the resin is uncatalyzed changes the reaction rate or stoichiometry. To compensate, the RTM resin must contain excess catalyst to balance out the approximately 5% uncatalyzed resin already on the preform. The inclusion of the catalyst in the unreacted RTM resin mixture reduces the pot life of the mixed RTM resin, pot life being a critical processing parameter. The prior art also uses a solid resin system to prevent caking and reflow melting to provide greater ease of application and handling. This results in a more brittle preform which will shear the layers of fabric apart if stressed.

SUMMARY OF THE INVENTION

In accordance with the present invention, there is provided a method of making composite preforms which overcomes or at least minimizes the problems inherent in the prior art. The process in accordance with the present invention is fully reactive and does not degrade critical properties of the composite. Furthermore, the catalyst is in the binder preform resin, unreactive with the binder resin until introduction of the RTM resin, and not stoichiometrically sensitive as in the prior art. The application method preferably uses controlled robotic machines, thereby improving the consistency and quality of the binder resin distribution. The melt viscosity and volumetric delivery of the preform binder resin are controllable by current technology. The present invention utilizes a resin which is semi-solid at room temperature and which holds the preform in the desired shape.

Briefly, dry fibers, which may be in the form of a woven or unwoven fabric, mat or unidirectional tape, preferably on a roll, preferably but not necessarily having a thickness of from about 4 to about 11 mils, are provided and made available for application of a catalyzed thermosetting resin which is semi-solid, highly viscous and acts as a thermoplastic. If the fibers are used in the unwoven state, they are generally positioned in the direction wherein such directionality is required. The fibers are preferably dry and have the properties of compression, tensile strength (ultimate maximum stress) and tensile modulus (ratio of stress to strain in linear elastic region), Poisson's ratio, density and elongation, such as, for example, glass, quartz, graphite or Kevlar™ fibers. The fibers can be stationary and sprayed, preferably uniformly, with a predetermined amount of resin and catalyst or can be sprayed with resin and catalyst at a controlled rate while the fibers are moving at a controlled rate so that the amount of resin on the fabric is controlled. The amount of resin deposited on the fibers is from about 5 to about 10 percent by weight of the fibers, the amount of resin used being as small as possible consistent with securing the fibers together in the final composite. The resin is a non-brittle catalyzed reactive semi-solid at room temperature thermosetting resin which is tacky at room temperature with thermoplastic properties, preferably an epoxy and preferably bisphenol A epoxy resin, such resin generally having a molecular weight from about 300 to about 400, with a catalyst in sufficient amount to be capable of catalyzing the spray applied binder resin and the RTM resin when mixed together, the catalyst being preferably cobalt naphthanate, cobalt acetylacetonate, copper acetylacetonate or zinc octoate. The ratio by weight of catalyst to resin is from about 60 to about 150 parts per million. A true catalyst is added to the resin system to maintain the reactivity rate when the final resin blend is introduced into the tool, such as a mold. This small percentage of resin with catalyst is heated with moderate amounts of heat sufficiently high to permit the resin to flow, and thermosetting will not take place (generally below 150° F.) on the layers of fabric to bond the resin to the fabric. The catalyst in the tackifier resin becomes active later in the process and only when all the components of the RTM resin are present, the RTM components being in this case (1) the epoxy resin, (2) the polycyanate and (3) catalyst. The fibers can then be stacked or rolled up in a roll with intervening release liner if in roll form initially for later use.

The process continues wherein like patterns or sheets of the fibers coated with catalyst-containing resin are then cut from the roll and made into sheets if not already in sheet form, stacked onto each other and placed in a tool, preferably in the form of a mold. Pressure and/or heat are used to form the resin and catalyst-coated fiber to the mold shape. A hot press, such as, for example, an iron, is applied to the fiber, pressing the fiber to the mold shape with heat to melt the resin which acts as a thermoplastic, viscous liquid at this time. The resin-coated fiber sheets can be placed in the mold and pressured and/or heated therein over each other one or more at a time up to all of the sheets at one time and all the sheets in the mold are pressured and/or heated together to provide a preform. This preform retains the shape of the mold when cooled, this specifically being the shape of the desired part. The use of a semi-solid resin allows the preform to be handled without shearing of the layers of fabric, unlike the brittle solid resin systems of the prior art. Multiple layers of fabric can be preformed using this tacking method without affecting the RTM process or finished part properties. The mold is then closed and a polycyanate and an epoxy resin or a polycyanate resin alone which are or can be made flowable into the mold and wherein the epoxy resin can be the same or different from the epoxy resin initially sprayed on the fibers, are then injected into the mold to cross-link and cure with the resin and catalyst previously deposited onto the fibers. The ratio of epoxy resin to polycyanate by weight is from a finite amount approaching zero to about 60 percent and preferably from about 5 to about 60 percent by weight or a 100 percent amount of polycyante resin can be used. The shaped, cured composite is then removed from the mold.

DESCRIPTION OF THE PREFERRED EMBODIMENT

EXAMPLE 1

A roll of woven fabric of dry fiberglass™ fibers having a thickness of 11 mils was rolled out on a table and sprayed with a mixture of 95 percent by weight bisphenol A epoxy resin having a molecular weight of 325 and 5 percent by weight bisphenol A epoxy resin having a molecular weight of 525 and 120 ppm cobalt naphthanate catalyst. The epoxy resin/catalyst blend was then spray applied at 200° F. to the room temperature unrolled fabric. The resin cooled upon contact with the fabric without significant fabric wetting. The fabric was then rerolled with a polyethylene film release liner. One to ten patterns of the fabric coated with the resin/catalyst blend were then cut from the roll, stacked and placed in a tool in the form of a mold, one or more pattern at a time. Heat and pressure, such as a press or iron, was then applied to the fabric either after each pattern or group of patterns was placed in the tool, forcing the fabric into the shape of the mold by melting the resin which acts as a thermoplastic due to the applied heat and/or pressure and is a viscous liquid at this time. This procedure is repeated until as many layers of fabric as desired have been placed in the mold to provide a preform. This preform can be cooled and removed from the mold and retains the shape of the mold when cooled. If removed from the mold, the preform is in the shape of the desired part. The preform, however, was retained in the mold and the mold was then closed. A premixed thermosetting resin, such as bisphenol A epoxy having a molecular weight of 175 and a polycyanate along With a tackifier resin with a ratio by weight of about 45 parts epoxy, about 50 parts polycyanate and about 5 parts tackifier were then injected into the tool or mold in standard manner along with a catalyst, such as cobalt naphthanate to cross-link and cure with the resin previously deposited onto the fibers. The shaped composite was then removed from the mold. The ratios as set forth need not be almost exact as in the prior art since the method displays stoichiometric insensitivity.

EXAMPLE 2

Example 1 was rerun exactly as described with the exception that patterned sheets of graphite fiber fabric replaced the fiberglass™ fabric. The results were the same as with the fiberglass™ fabric.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A method of molding a composite preform comprising the steps of:
    (a) providing at least one layer of fibers;
    (b) applying both a mixture of a catalyst in sufficient amount to be capable of causing cross-linking of a later applied mixture of a second epoxy resin and polycyanate and a first viscous, thermoplastic epoxy resin non-reactive with said catalyst to said at least one layer of fibers;
    (c) then applying at least one of heat or pressure to said at least one layer of fibers to melt and shape said first epoxy resin and allow said at least one layer of fibers to fuse together to form a preform; and
    (d) then impregnating said preform with said mixture of a second epoxy resin and a polycyanate to cause cross-linking of said mixture including said first epoxy resin applied in said step (b) catalyzed by said catalyst.

2. The method of claim 1 further including the steps of providing a mold and placing said at least one layer of fibers in said mold prior to said step (c) and wherein said impregnating takes place in said mold.

3. The method of claim 1 wherein said at least one layer of fibers is a fabric of fibers.

4. The method of claim 2 wherein said at least one layer of fibers is a fabric of fibers.

5. The method of claim 1 wherein said first epoxy resin and said second epoxy resin are the same.

6. The method of claim 2 wherein said first epoxy resin and said second epoxy resin are the same.

7. The method of claim 3 wherein said first epoxy resin and said second epoxy resin are the same.

8. The method of claim 4 wherein said first epoxy resin and said second epoxy resin are the same.

9. The method of claim 1 wherein said catalyst is taken from the class consisting of cobalt naphthenate, cobalt acetylacetonate, copper acetylacetonate and zinc octoate, said first and second epoxy resins are a bisphenol A epoxy resin.

10. The method of claim 2 wherein said catalyst is taken from the class consisting of cobalt naphthenate, cobalt acetylacetonate, copper acetylacetonate and zinc octoate, said first and second epoxy resins are a bisphenol A epoxy resin.

11. The method of claim 3 wherein said catalyst is taken from the class consisting of cobalt naphthenate, cobalt acetylacetonate, copper acetylacetonate and zinc octoate, said first and second epoxy resins are a bisphenol A epoxy resin.

12. The method of claim 4 wherein said catalyst is taken from the class consisting of cobalt naphthenate, cobalt acetylacetonate, copper acetylacetonate and zinc octoate, said first and second epoxy resins are a bisphenol A epoxy resin.

13. The method of claim 5 wherein said catalyst is taken from the class consisting of cobalt naphthenate, cobalt acetylacetonate, copper acetylacetonate and zinc octoate, said first and second epoxy resins are a bisphenol A epoxy resin.

14. The method of claim 6 wherein said catalyst is taken from the class consisting of cobalt naphthenate, cobalt acetylacetonate, copper acetylacetonate and zinc octoate, said first and second epoxy resins are a bisphenol A epoxy resin.

15. The method of claim 7 wherein said catalyst is taken from the class consisting of cobalt naphthenate, cobalt acetylacetonate, copper acetylacetonate and zinc octoate, said first and second epoxy resins are a bisphenol A epoxy resin.

16. The method of claim 8 wherein said catalyst is taken from the class consisting of cobalt naphthenate, cobalt acetylacetonate, copper acetylacetonate and zinc octoate, said first and second epoxy resins are a bisphenol A epoxy resin.

17. The method of clam 1 further including the step of placing said preform in said mold and wherein said step of impregnating said preform with a mixture of a second epoxy resin and a polycyanate to cause cross-linking including said epoxy resin applied in step (b) is performed in said mold.

18. The method of claim 3 further including the step of placing said preform in said mold and wherein said step of impregnating said preform with a mixture of a second epoxy resin and a polycyanate to cause cross-linking including said epoxy resin applied in step (b) is performed in said mold.

19. The method of claim 7 further including the step of placing said preform in said mold and wherein said step of impregnating said preform with a mixture of a second epoxy resin and a polycyanate to cause cross-linking including said epoxy resin applied in step (b) is performed in said mold.

20. The method of claim 15 further including the step of placing said preform in said mold and wherein said step of impregnating said preform with a mixture of a second epoxy resin and a polycyanate to cause cross-linking including said epoxy resin applied in step (b) is performed in said mold.

* * * * *